US007284204B2

(12) United States Patent
Lee

(10) Patent No.: US 7,284,204 B2
(45) Date of Patent: Oct. 16, 2007

(54) SYSTEM, METHOD, AND VISUAL USER INTERFACE FOR EVALUATING AND SELECTING SUPPLIERS FOR ENTERPRISE PROCUREMENT

(75) Inventor: Juhnyoung Lee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 10/108,345

(22) Filed: Mar. 29, 2002

(65) Prior Publication Data

US 2003/0184588 A1 Oct. 2, 2003

(51) Int. Cl.
*G06F 3/48* (2006.01)
(52) U.S. Cl. .................................... 715/764
(58) Field of Classification Search ............... 715/764, 715/808, 711, 763, 853; 705/10
See application file for complete search history.

(56) References Cited

U.S. PATENT DOCUMENTS

| | | | |
|---|---|---|---|
| 5,953,707 A * | 9/1999 | Huang et al. ................. 705/10 |
| 6,647,380 B1 | 11/2003 | Yotsukura ....................... 707/2 |
| 6,826,543 B1 * | 11/2004 | Harford et al. ............... 705/37 |
| 6,850,900 B1 | 2/2005 | Hare et al. ..................... 705/26 |
| 6,868,525 B1 | 3/2005 | Szabo .......................... 715/738 |
| 7,043,457 B1 | 5/2006 | Hansen ......................... 705/80 |
| 2002/0156687 A1 | 10/2002 | Carr et al. ..................... 705/26 |
| 2003/0004836 A1 | 1/2003 | Otter et al. ................... 705/27 |
| 2003/0004850 A1 * | 1/2003 | Li et al. ........................ 705/37 |
| 2003/0009386 A1 * | 1/2003 | Menninger .................... 705/26 |
| 2003/0090509 A1 * | 5/2003 | Tetambe et al. ............. 345/738 |

* cited by examiner

*Primary Examiner*—Kristine Kincaid
*Assistant Examiner*—Thanh Vu
(74) *Attorney, Agent, or Firm*—Stephen C. Kaufman, Esq.; McGinn IP Law Group, PLLC

(57) ABSTRACT

A method (and visual user interface) of evaluating and selecting suppliers for procurement, includes structuring supplier information on a visual interface of a display, and providing an analysis capability for facilitating evaluation and selection of one or more suppliers for buying goods and services. The visual interface allows a user to directly manipulate data points in the visual interface to explore an information space of potential suppliers and to discover patterns, anomalies, and trends in support of the evaluation.

49 Claims, 12 Drawing Sheets

SYSTEM, METHOD, AND VISUAL USER INTERFACE FOR EVALUATING AND SELECTING SUPPLIERS FOR ENTERPRISE PROCUREMENT

CROSS-REFERENCE TO RELATED APPLICATION

The present application is related to U.S. patent application Ser. No. 10/108,699, concurrently filed on Mar. 29, 2002, to Juhnyoung Lee, entitled "METHOD AND VISUAL USER INTERFACE FOR INTERACTIVE VISUAL ANALYSIS OF BUSINESS EXPENDITURE", assigned to the present assignee, and incorporated herein by reference.

DESCRIPTION

BACKGROUND OF THE INVENTION

1. Field of the Invention

The present invention generally relates to view and analysis of information on suppliers for corporate procurement and, more particularly, to a method for structuring and viewing supplier information and a visual user interface for facilitating the evaluation and selection of one or more suppliers among a set of potential suppliers.

2. Description of the Related Art

Procurement is an essential part of any business. It is reported that businesses spend 60% or more of revenue on external purchases of goods and services. For example, a company with revenue of $1B spends $570M for buying goods and services with non-production (indirect material) purchasing of $348M. It is also reported that the 250 largest publicly held companies in the U.S. spent about $1.4 trillion in goods and services in 1999. This amount is a 10% increase over the amount spent in 1998.

Because procurement is a significant portion of overall business cost, companies are increasingly interested in cutting procurement spending in an effort to increase profitability. Savings of 5 to 15% of a company's total procurement spending by using a "systematic approach to procurement" can translate into millions of dollars in savings for large companies.

Despite its significance, conventional practices of corporate procurement are not always as effective as they should be, and they depend heavily on human skills. Indeed, most procurement professionals are left on their own in finding, evaluation, engaging and retaining suppliers. This reality usually stems from the fact that companies do not provide their buyers with information about suppliers that can enlighten decisions about which suppliers to use for which business situations.

Recently, procurement practices using the Internet technology (often referred to as e-procurement) promised to reduce the time, effort and costs associated with requesting, approving, and ultimately, purchasing supplies.

However, this technology until now merely helps reduce paper processing, and does not appear to have added much value. This technology appears to have merely replaced the telephone or facsimile machine. It does not save much time, although it provides minor benefits such as viewing online product information and allowing placement and tracking of orders 24 hours per day, 7 days-a-week.

Further, this technology appears to have merely automated the purchase process without much decision support capability, and thus is suited merely for "spot-buying" of indirect materials and other non-critical commodities.

To truly revamp procurement strategies and cover the full spectrum of corporate purchases including the direct/planned group (e.g., key components and key materials), the indirect/planned group (e.g., mission-critical Maintenance Repair Operation (MRO) and capital equipment), the direct/unplanned group (e.g., commodity materials and spot purchases), and the indirect/unplanned group (e.g., office supplies and travel), a systematic approach to purchasing intelligence is required in the areas of strategic sourcing and supplier relationship management.

Strategic sourcing refers to the process that identifies opportunities, evaluates potential sources, negotiates contracts and continually manages supplier relationships to achieve corporate goals.

Supplier relationship management refers to the practices that are needed to establish strategic relationships with suppliers of products and services that are important to a company's profitability. A systematic approach to supplier relationship management spans all functional areas and requires an enterprise-wide approach to squeeze waste out of the supply chain, and to re-engineer the processes that link buyers and suppliers.

More specifically, the efforts for procurement efficiency such as strategic sourcing and supplier relationship management try to systematically find answers to the following business questions (in several categories) to cut overall procurement expenditure. Questions asked include the following examples such as:

Business questions on sourcing: Whom should I buy from? What should I buy from each supplier? How should I buy (e.g., contracts or "spot buying")? Are there too many suppliers in a particular area (consolidation opportunity)? Are there opportunities to consolidate suppliers for greater efficiency or better prices? Are there too few suppliers for mission-critical goods and services? Do I need to diversify suppliers for a particular goods and services? How can I make procurement predictable and repeatable?

Business questions on purchasing: How much to buy? When do I need it? Where do I need it? How much/often are purchases made outside of a corporate agreement? How should I eliminate "maverick buying" (i.e., employees purchasing items outside company-wide agreements) by establishing contracts and prices, which all requisitions must reference? How should I negotiate better volume discount and delivery time? How should I consolidate spending to negotiate from a position of strength? To what extent are procurement policies enforced? Are there any duplicate purchases?

Business questions on suppliers: How should I rate and rank suppliers? How much have I spent for each supplier? Who are the top suppliers (in terms of dollar amount, strategic fit, or performance)? How well are suppliers performing with respect to their contract obligations? How should I measure supplier performance over multiple attributes? How much does a particular supplier depend on my company for business?

Business questions on product design: What parts should I reuse for design? What equipment or MRO items do I need? Who should I outsource to? How should I collaborate with my business partners (e.g., suppliers and customers)?

Thus, prior to the present invention, there has been no method or visual user interface for providing an accurate overview of the information space comprising potential suppliers, or a set of useful analysis capabilities on the information space to facilitate evaluating and selecting the potential suppliers in an effective manner to save business cost in buying materials, goods and services.

SUMMARY OF THE INVENTION

In view of the foregoing and other problems, drawbacks, and disadvantages of the conventional methods and structures, an object of the present invention is to provide a method and a visual interface for structuring supplier information and providing analysis capabilities for facilitating evaluation and selection of one or more suppliers for buying goods and services.

Another object of the present invention is to provide a method and a visual interface for allowing the user to directly manipulate data points in the visual interface to explore the information space of potential suppliers and to discover useful patterns, anomalies, and trends that will help evaluate and select one or more suppliers in a way to save time and cost for purchase of goods and service.

A further object of the present invention is to provide a method and a visual interface for displaying multiple attributes of suppliers that must be taken into account in evaluation and selection of one or more suppliers for buying goods and services.

Another object of the present invention is to provide a method and a visual interface for customizing various properties (e.g., importance and desirable value range) of supplier attributes for an interactive analysis.

A further object of the present invention is to provide a method and a visual interface for dynamically calculating and displaying scores of suppliers based on the importance of supplier attributes dynamically set by users.

Yet another object of the present invention is to provide a method and a visual interface for allowing the user to dynamically include (or exclude) one or more attributes in the analysis of suppliers and in the calculation of supplier scores and ranking.

A still further object of the present invention is to provide a method and a visual interface for displaying brief information of various aspects of suppliers by using a tool-tip operation with a pointing device such as a mouse, track ball, touch pad, light pen, etc.

Yet another object of the present invention is to provide a method and a visual interface for displaying detail information of various aspects of suppliers in a pop-up window by using a click operation with a pointing device such as a mouse, etc.

A still further object of the present invention is to provide a method and a visual interface for allowing the user to filter the potential suppliers by using a special filter feature that works based on the supplier scores and ranks.

Another object of the present invention is to provide a method and a visual interface for allowing the user to identify different suppliers without referring to any text caption, but instead based on the color of the image artifacts that represent suppliers.

Yet another object of the present invention is to provide a method and a visual interface for allowing the user to view the information on potential suppliers in an interactive table-based interface that is similar to popular spreadsheet-type computer programs.

A still further object of the present invention is to provide a method and a visual interface for synchronizing the analysis operations between the table-based interface and the visualization-based interface for providing more powerful analysis capabilities.

In order to accomplish the objectives of the present invention, a user of the system, method and visual interface (i.e., a business organization) preferably collects useful supplier information in central data storage from diverse data sources. The collection and aggregation of the supplier information preferably is processed periodically (e.g., daily, weekly or monthly, etc.), to continuously reflect the updates on the supplier information.

Also, the central storage of the supplier information preferably uses a certain data model to hold the supplier information in a way that facilitates the creation and management of supplier information views and analysis in the visual user interface of the present invention.

In a first aspect of the present invention, a method (and visual user interface) of evaluating and selecting suppliers for procurement, includes structuring supplier information on a visual interface of a display, and providing an analysis capability for facilitating evaluation and selection of one or more suppliers for buying goods and services. The visual interface allows a user to directly manipulate data points in the visual interface to explore an information space of potential suppliers and to discover patterns, anomalies, and trends in support of the evaluation.

With the unique and unobvious aspects of the present invention, the supplier evaluation system displays the supplier information by using the graphical user interface presented in the invention so that the user can interactively analyze the supplier information by using various visual analysis tools.

With the visual user interface, the user can directly manipulate the components in the presentation to explore and discover patterns and trends in the supplier information useful for saving time and cost for selecting one or more suppliers in buying goods and services.

Thus, the invention allows a user (e.g., a purchasing agent or the like) to make easily a more informed, more efficient decision in selecting a supplier, based on empirical, scientific evidence.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
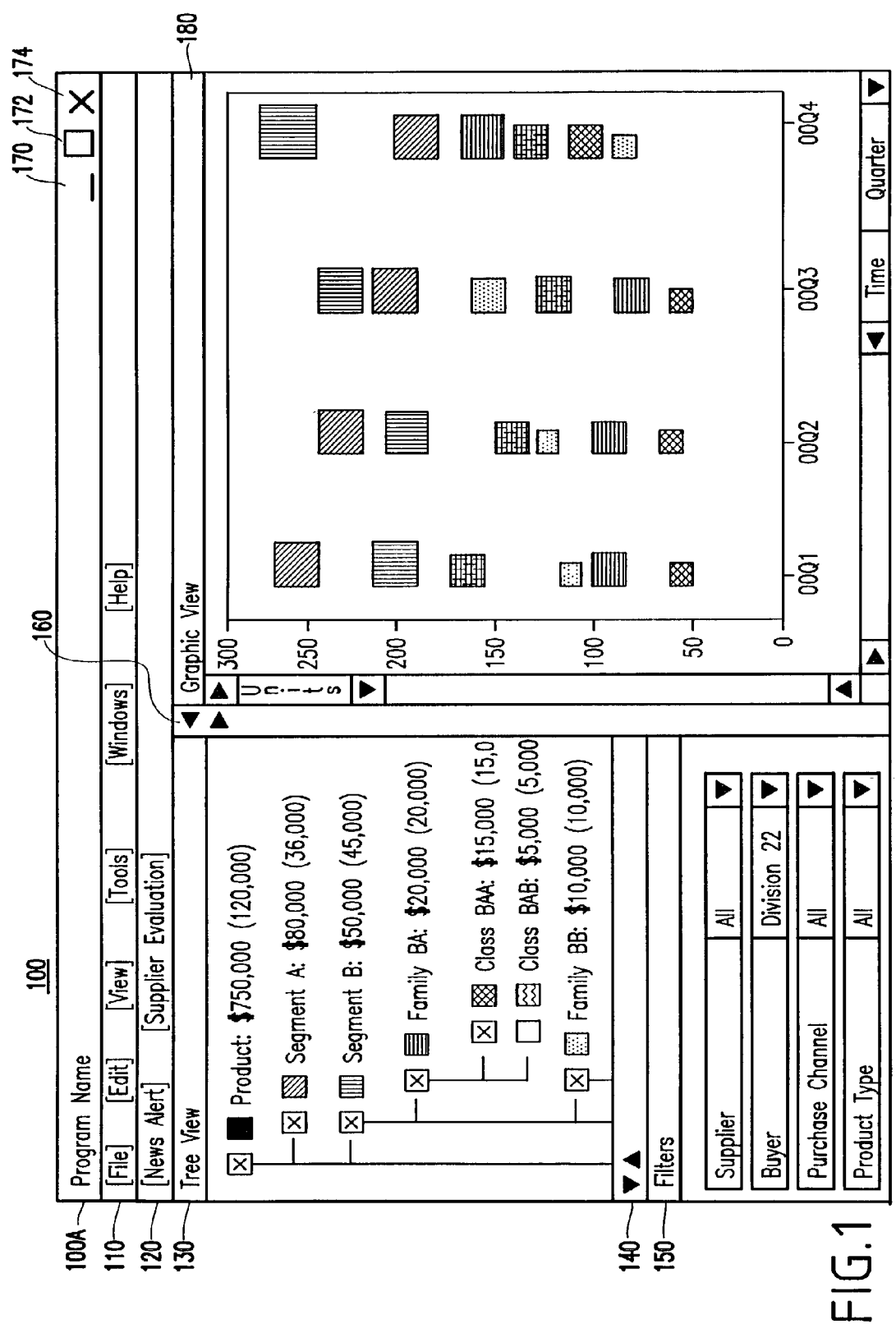
FIG. 1 is a graphical user interface (GUI) 100 of a multi-dimensional corporate procurement system according to the present invention.

Referring now to the drawings, and more particularly to FIGS. 1-14, there are shown preferred embodiments of the method and structures according to the present invention.

Preferred Embodiment

FIG. 1 illustrates a graphical user interface (GUI) 100 for multi-dimensional analysis of enterprise procurement according to the present invention. The graphical user interface can be implemented in a desktop software program that can run as a stand-alone application on the user's computer, and/or in a Web application that can run from a Web browser program. Regardless of the execution platform, the system can take the conceptually same graphical user interface for facilitating the analysis of business expenditure from many different perspectives.

As shown in FIG. 1, some key components of the graphical user interface 100 include a Tree View 130, a Filter View 150, and a Graphic View 180, each of which will be described in detail below.

The Tree View 130 is a hierarchical presentation of the summarized expenditure data against one or more dimensions selected by the user.

The Filter View 150 is a presentation of every dimension of expenditure data in consideration that were not selected by the user for the Tree View 130. The user can refine the summarized expenditure data shown in the Tree View 130 by using one or more filters associated with the expenditure data dimensions provided in the Filter View 150.

The Graphic View 180 provides a visual presentation of the expenditure data shown also on the Tree View 130. Unlike the Tree View 130, the Graphic View 180 presents the entire expenditure data set in a single screen to help the user explore the information space in an effective manner, and also allows the user to directly manipulate the data point on the Graphic View 180 to discover interesting patterns and trends.

The graphical user interface 100 in FIG. 1 provides other features as well as these three view components 130, 150, and 180.

First, the graphical user interface 100 provides the program name bar 100A at the top of the interface. Oftentimes, the program name bar 100 displays the data file name that is currently presented in the program, as well as the program name.

Second, the interface provides a menu bar 110 under the program name bar 100A. The menu bar may include one or more menus with each menu being presented as a pull-down menu or the like that the user can easily access and select by using a computer-pointing device such as a mouse, track ball, touch pad, joystick, light pen, etc.

In FIG. 1, a set of menus that are basic to most computer programs are presented. For example, the "File" menu may allow the user to open, save, and exit from one or more data files of the program. The "Edit" menu may allow the user to cut, paste, copy, and delete one or more pieces or data in the current data file. The "View" menu may allow the user to change the view of the one or more components of the data in the current data file by using zooming and other visual effect tools.

The "Tools" menu may allow the user to utilize one or more software applications that work on top of the current program. The current graphical user interface provides a tool bar 120 under the menu bar 110. The "Windows" menu may allow the user to select different layouts (e.g., tile or cascade layout) of component windows (i.e., the Tree View 130, the Filter View 150, and the Graphic View 180), in the graphical user interface.

In relation to the "Windows" menu, the graphical user interface 100 provides window separators 140 and 160 among the three component windows (i.e., the Tree View 130, the Filter View 150, and the Graphic View 180). By using the separators 140 and 160, the user can directly re-size the component windows, and shut out and maximize one or more component windows with a single click.

The "Help" menu in the menu bar 110 provides various helpful information of the program to the user. The graphical user interface 100 also provides shortcuts (i.e., single click operations) for minimizing 170, maximizing 172, and closing 174 the window of the graphical user interface 100.

The current graphical user interface provides a tool bar 120 under the menu bar 110. FIG. 1 presents several tools in the tool bar 120; one is the "News Alert" and the other "Supplier Evaluation". The "News Alert" feature provides a real-time feed of news related to the corporate expenditure by using the user profile that is configured by the user a priori. The "Supplier Evaluation" feature is another software application that is used to evaluate and select one or more suppliers for a particular purchase need. This feature is a key focus of the present invention.

Figure 2:
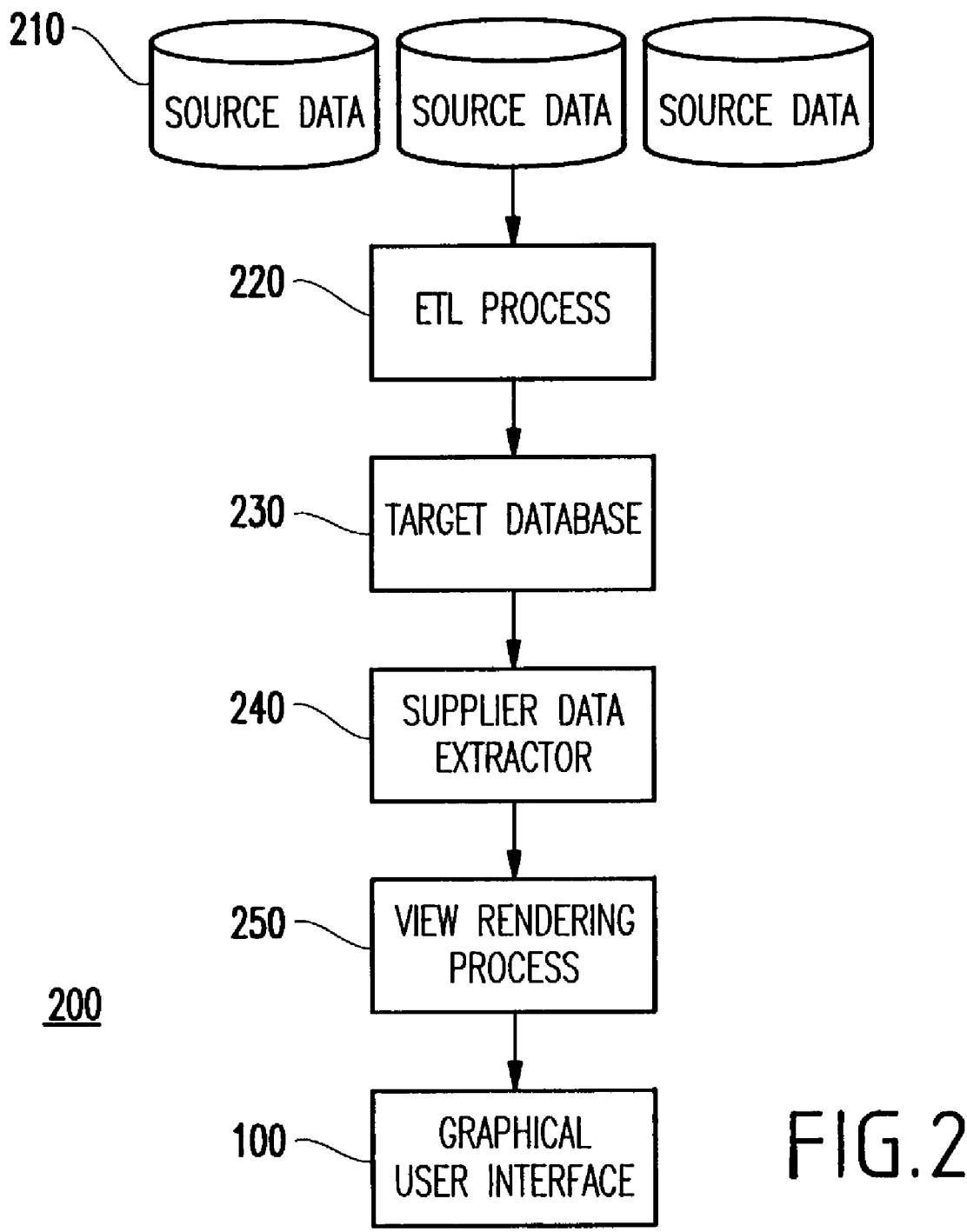
FIG. 2 is a block diagram of system architecture for a supplier evaluation system 200.

FIG. 2 is a block diagram of system architecture for the supplier evaluation system 200.

To accomplish the objectives of the present invention, a user of the system (i.e., a business organization) collects various information about suppliers, and aggregates the supplier information in central data storage from various sources 210 of supplier data, either online or off-line.

The sources for supplier information 210 may include various data, such as related external information such as individual supplier's revenue to calculate the percentage of its business the user organization's expenditure with the supplier represents, and the supplier's current levels of debt and growth to determine how much risk the user organization takes by doing business with the suppler.

Also, the source data 210 may include standards for classifying suppliers and goods. An example of a de facto standard for supplier classification is a D-U-N-S number from Dun & Bradstreet, Co. Also, an emerging de facto standard for classifying goods and services is UN/SPSC (Standard Product and Service Code).

Thus, the data can be public (DUNS number, UN/SPSC classification, stock market performance, etc.) which is publicly available over the Internet or other medium.

The data assembled also may include private data (e.g., private to a specific buyer) assembled by the corporate (e.g., inhouse) procurement specialists. Private data may include the term of the relationship with the supplier, the past performance of the supplier such as how long a supplier takes to fill an order, whether any preferred terms of payment are offered by the supplier, the strategic fit of the supplier, whether the supplier has missed any deadlines, etc.

The user organization aggregates the source data 210 to create a target database 230. This data aggregation process is often called an ETL (Extract, Transform, and Load) process 220. The process may involve selecting useful, relevant data from the source databases 210, changing the format of the extracted data, cleaning up the data if there is any "noise" in the data, and loading the data into the target database 230. The ETL process 220 preferably is executed periodically (e.g., daily, weekly or monthly), to continuously reflect recent activities to the central storage of spending data (i.e., the target database 230). The target database 230 is often referred to as a "data warehouse."

The database system that stores the target database 230 provides the user with a mechanism to access the supplier data in it. The mechanism is referred to as the "supplier data extractor" 240.

The view rendering process 250 utilizes the supplier data extractor process 240 to retrieve supplier data that is used to generate the graphical user interface 100 of the multi-dimensional business procurement analysis system, optionally based on the user configuration given a priori by the user. The view rendering process 250 also generates the graphical user interface 300 of the supplier evaluation system of the present invention.

Through the graphical user interface 100, the user can view compact and systematic presentation of business expenditure data, directly manipulate and interact with various data points on the view, and filter them with dynamically created data queries in an interactive way to explore, understand, and discover useful and relevant patterns, anomalies, and trends in supplier information.

Figure 3:
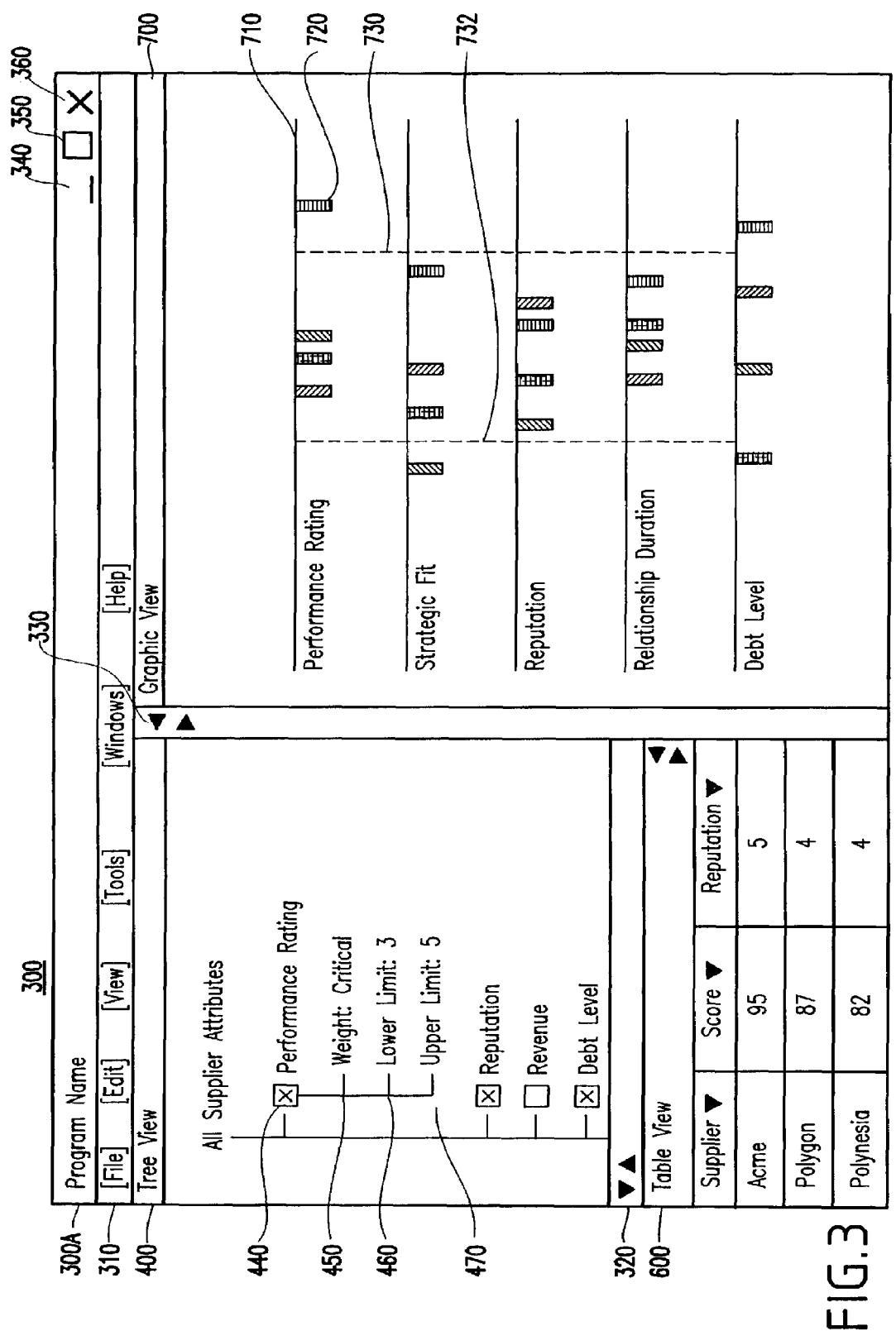
FIG. 3 is a graphical user interface 300 of the supplier evaluation system 200 of FIG. 2.

FIG. 3 is a graphical user interface 300 of the supplier evaluation system. Several key components of the graphical user interface are the Tree View 400, the Table View 600, and the Graphic View 700, each of which will be described in detail later.

The Tree View 400 is a hierarchical presentation of various attributes of suppliers that are used in evaluating alternative suppliers for a particular purchase case. In this hierarchical presentation, a supplier attribute 440 may include two or more sub-attributes. For example, an attribute, stock values, may include three sub-attributes (e.g., today's value, 52-week high value, and 52-week low value).

Every data entry (i.e., a supplier attribute 440) in the Tree View 400 has three exemplary property variables (i.e., the weight 450, the lower limit value 460, and the upper limit value 470). The weight 450 of an attribute is used in calculating the scores of alternative suppliers that will be presented in the score column in the Table View 600. The calculation of supplier scores and the ranking of suppliers by score will be explained in detail below with reference to FIG. 6.

The lower 460 and upper limit 470 values represent the value range of this particular attribute desired by the evaluator of suppliers. The desirable value range (e.g., lower and upper limits) of each attribute is visually presented by dotted lines 730 and 732, respectively, in the Graphic View 700. Such a range helps the evaluator visually understand whether attribute values are within the desirable value range or not, and how attribute values of alternative suppliers are distributed in relation to the desirable range.

Another feature of the Tree View 400 is the check boxes that are associated with supplier attributes in the tree, one for each attribute. The user (i.e., the supplier evaluator) can select one or more attributes in the tree that are used in supplier evaluation (i.e., ones that are presented in the Graphic View 700).

That is, when the user selects an attribute by checking the box of the attribute (e.g., box 440, etc.), the attribute is displayed as a horizontal line in the Graphic View 700 of FIG. 3.

Also, when the user de-selects the attribute by de-checking the box of the attribute, the corresponding attribute line disappears from the Graphic View 700. It is noted that this coordination between the Tree View 400 and the Graphic View 700 happens in a dynamic, interactive way.

That is, the changes the user makes with check boxes in the Tree View 400 are immediately reflected in the Graphic View 700.

Similarly, the user can modify the values of property variables of attributes (i.e., weight 450, lower limit 460 and upper limit values 470) any time, and the changes in the Tree View 400 are immediately reflected in the Table View 600 and the Graphic View 700.

It is noted that the user can specify the weight, as well as the upper and lower limit values. For example, such is performed by the user going to the Tree View and clicking on "weight" and inputting the criteria. In the example of FIG. 3, the user could click on "critical" and then input a new value such as "negotiable" or "informational" or the like. Alternatively, in another embodiment, for the "weight" the user could input a number in a predetermined range. For example, the range could be 1-10, where "1" represents "informational" (or "don't care"), a "5" represents "negotiable", and a "10" represents a "critical" criteria. Based on this revised weight value, the graphic view 700 would be adjusted accordingly.

Similarly, the user could click on any of the lines 730, 732 (or any other line in the graphic view 700) and then move them to a position where the user desires to modify the range (e.g., make the range larger or smaller). This action would simultaneously adjust the tree view (specifically, the lower and upper limit values 460 and 470 of each attribute), as well as the table view 600 (specifically, the score of each supplier recalculated for the updated lower and upper limit values of each attribute).

Further, as shown in the Tree View 700, there are some (e.g., three) checked boxes in the attributes boxes including performance rating, reputation, and debt level. Only the checked attribute values are shown in the graphic view 700. For example, "revenue" which is unchecked in the tree view 400, is not shown in the graphic view 700. Checking the "revenue" box would automatically and immediately show the "revenue" in the graphic view 700.

By using this interactive analysis capability, the user of this supplier evaluation system of the present invention can dynamically change the analysis criteria and perform what-if analyses in the Table View 600 and the Graphic View 700. This is a key advantage of the present invention.

While the Tree View 400 displays the attributes for evaluating suppliers and provides visual facilities to dynamically modify the properties of the attributes, the Table View 600 and the Graphic View 700 present the set of alternative suppliers which are the object of evaluation by using the attributes and their values given in the Tree View 400.

In the Table View 600, each row represents an alternative supplier, while columns represent the attributes set in the Tree View 400 and the score of alternative suppliers. In the Table View 600, the user can sort the alternative suppliers by each column, either in an ascending order or in a descending order, by clicking on one of the down arrows (not referenced in FIG. 3). This table is a popular form with which most business users are already familiar.

The Graphic View 700 basically displays the same information as the Table View 600 (i.e., the set of alternative suppliers and their attribute values). One advantage of the Graphic View 700 over the Table View 600 is that, unlike the Table View 600, the Graphic View 700 allows the user to view the entire data set and the entire information space (i.e., all the alternative suppliers and all their attribute values), in a single screen, which facilitates exploring the information space, comparing different suppliers, and classifying alternatives by certain visual criteria. The single screen that displays the entire information space will deliver a lot of meaningful cues to the user helping evaluation and selection of appropriate suppliers.

Furthermore, the Graphic View 700 provides a plurality of visual facilities to allow the user to directly manipulate data points in the view 700 to explore and discover relevant trends and patterns in the information space.

Some basics of the Graphic View 700 include that each horizontal line 710 in the view 700 represents an attribute of suppliers selected in the Tree View 400, each short vertical line (often referred to as a "matchstick") 720 represents an attribute value of a particular supplier. The two long dashed vertical lines 730 and 732 represent the desirable value range of the selected attributes and correspond to the lower limit and upper limit selected in the tree view at 460 and 470, respectively.

Hence, for example, in FIG. 3, the graphic view illustrates that in regard to performance rating there are three (3) suppliers which are acceptable (e.g., within the range). Thus, as described above, when there are changes to the lower and/or upper limit value of any selected attributes in the Tree View 400, the view rendering process 250 rearrange the location of matchsticks to keep the desirable value range lines always straight helping the users visually.

It is noted that the matchsticks have certain patterns that visually help the user distinguish matchsticks that belong to different suppliers. That is, matchsticks that have the same pattern on them belong to a supplier, and matchsticks that have different patterns on them belong to different suppliers.

The graphical user interface in FIG. 3 provides other features as well as these three view components.

First, the graphical user interface provides the program name bar 300A at the top of the interface 300. Often, the program name bar 300A displays the data file name that is currently presented in the program, as well as the program name.

Second, the interface provides a menu bar 310 under the program name bar 300A. The menu bar may include one or more menus with each menu being presented as a pull-down menu or the like that the user can easily access and select by using a computer-pointing device such as a mouse. In FIG. 3, a set of menus that are basic to most computer programs are presented.

For example, the "File" menu may allow the user to open, save, and exit from one or more data files of the program. The "Edit" menu may allow the user to cut, paste, copy, and delete one or more pieces or data in the current data file. The "View" menu may allow the user to change the view of the one or more components of the data in the current data file by using zooming and other visual effect tools.

The "Tools" menu may allow the user to utilize one or more software applications that work on top of the current program. The "Windows" menu may allow the user to select different layouts (e.g., tile or cascade layout) of component windows (i.e., the Tree View 400, the Table View 600, and the Graphic View 700) in the graphical user interface. In relation to the "Windows" menu, the graphical user interface provides window separators 320 and 330 among the three component windows (i.e., the Tree View 400, the Table View 600, and the Graphic View 700).

By using the separators 320 and 330, the user can directly re-size the component windows, and shut out and maximize one or more component windows with a single click. The "Help" menu in the menu bar 310 provides various helpful information of the program to the user. The graphical user interface also provides shortcuts (i.e., single click operations) for minimizing 340, maximizing 350, and closing 360 the window of the graphical user interface 300.

Thus, by utilizing the views 400, 600, and 700 of the GUI 300 of FIG. 3 and by changing/modifying the values therein, the user can make a better informed decision on selecting suppliers.

Moreover, with the inventive GUI, the user can perform easily an exploratory analysis by changing values of attributes and seeing how the changes in the values affect the scores and how the distribution of attribute values in graphic form changes. This gives the user a better idea of how these values are distributed, clustered, or classified, etc. by using this information and can make a better decision on supplier selection.

Figure 4:
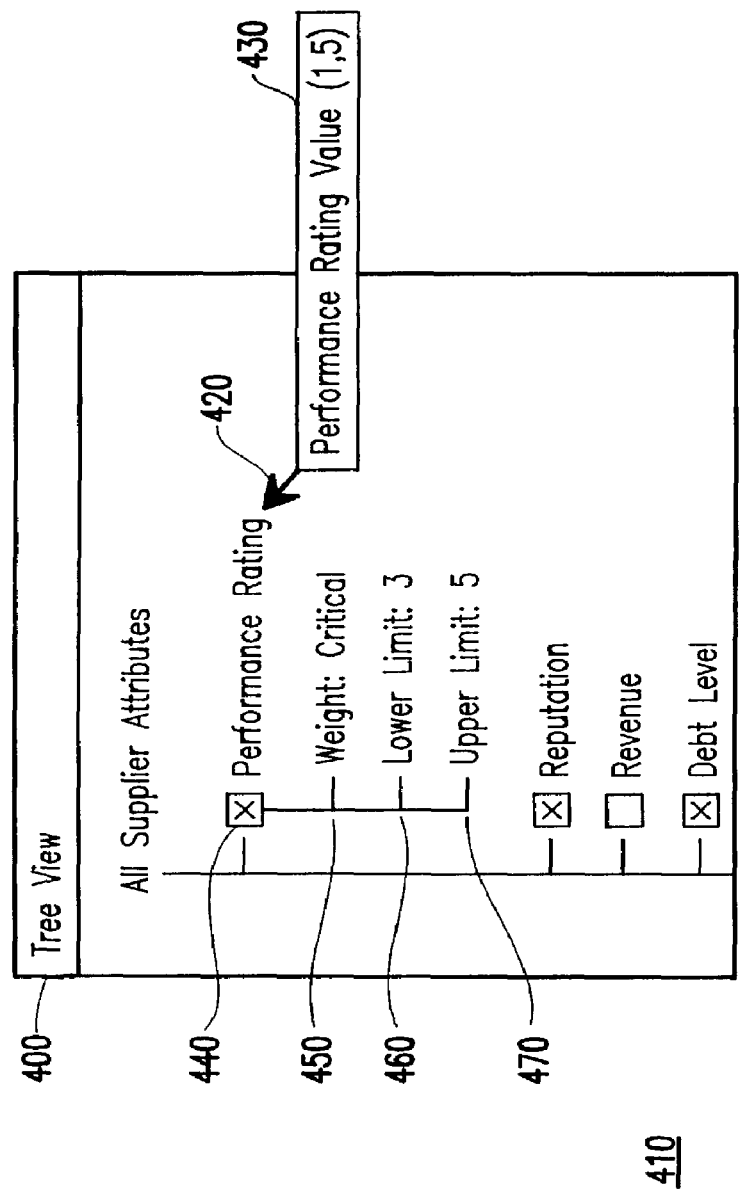
FIG. 4 is a display 410 of brief information by using a tool-tip operation in a Tree View 400.

FIG. 4 is a display of brief information of a supplier attribute by using a tool-tip operation in the Tree View. With the tool tip operation, a user can view a brief description of data entries (i.e., supplier attributes) in the Tree View 400 by using a tool-tip operation. Hence, the user can quickly obtain brief information about a data entry (e.g., an attribute) when the user is wondering about a certain entry, and then based on the brief information the user can decide to click on the entry or not to obtain more detailed information or not.

Thus, when a user points the input device (mouse, etc.) 420 at a particular data entry (i.e., a supplier attribute) 440 in the Tree View 400 with a pointing device such as a computer mouse, etc. for a specific amount of time (e.g., 5 seconds), a tool-tip box 430 automatically appears on the view that describes the particular data entry (i.e., the supplier attribute 440). There is no restriction on the type of the brief information generated by this tool-tip tool. Further, the media of the information may be text, visual, image, sound, animation, and so on.

In the particular example given in the Figure, the dynamically generated tool-tip box 430 gives a description about the supplier attribute (i.e., "Performance Rating" 440 indicating a scale of "1" through "5"). The user can view, without looking up any other information system, that the value of the supplier attribute (i.e., "Performance Rating") is between 1 and 5, which may help the user more clearly understand the meaning of the desirable value range (3, 5) specified by the lower and upper limit values 460 and 470.

Figure 5:
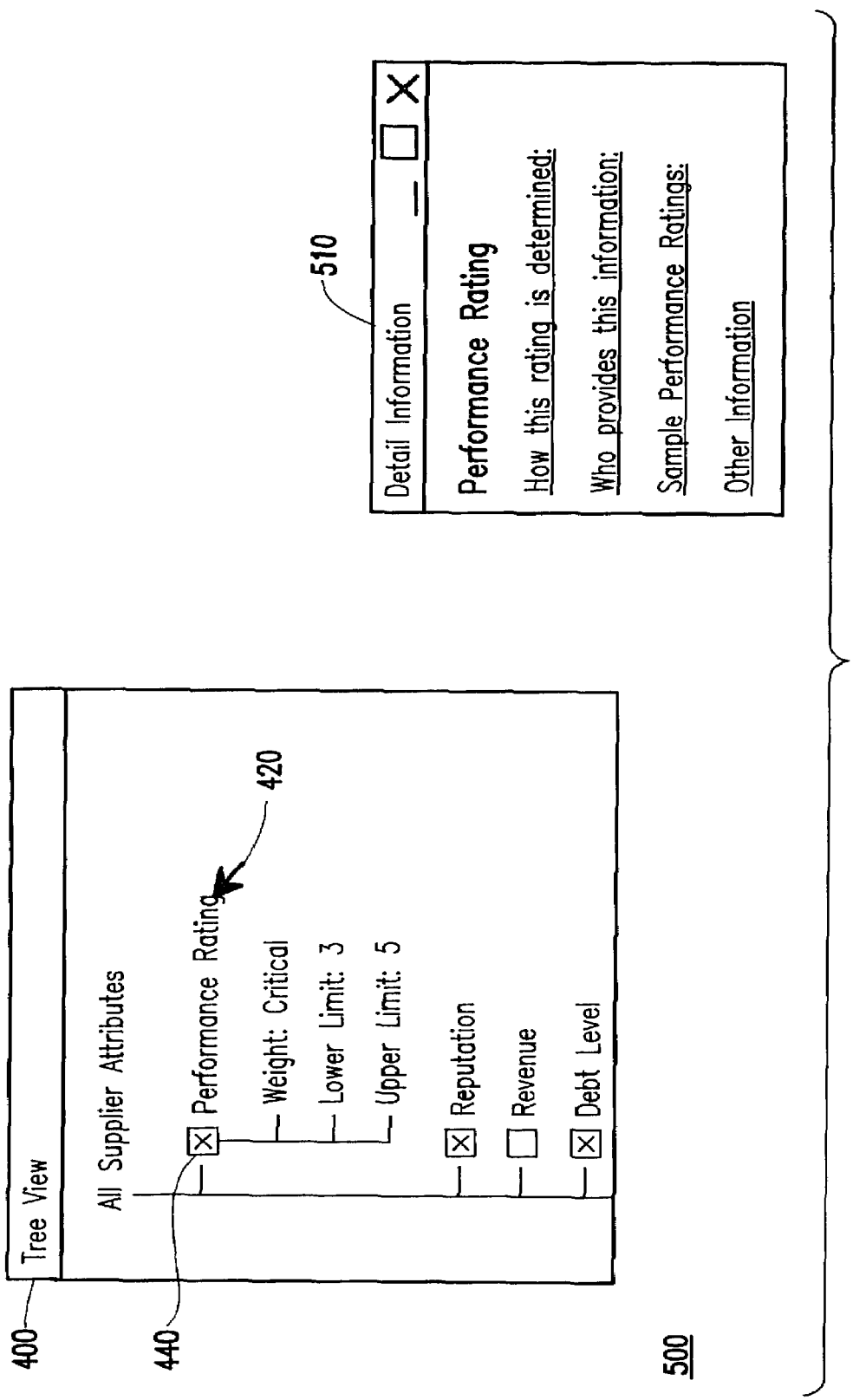
FIG. 5 is a display 500 of detail information by using a pop-up window 510 in the Tree View.

FIG. 5 is a display of detailed information of a supplier attribute by using a pop-up window 510 in the Tree View 400. Certain detailed information of data entries (i.e., supplier attributes) in the Tree View 400 can be provided by using a click operation 420 of a pointing device such as a computer mouse and a pop-up window 510. When a user points and clicks 420 a particular data entry (i.e., a supplier attribute 440) in the Tree View 400 with a pointing device such as a computer mouse, etc., a separate window 510 pops up and certain relevant detail information about the data entry (i.e., the supplier attribute 440) in the Tree View 400 is provided in the pop-up window 510.

There is no restriction on the type of the detail information generated in this pop-up window. The media of the information may be text, visual, image, sound, animation, and so on.

In the particular example given in FIG. 5, the dynamically generated window 510 provides a description about a particular supplier attribute (i.e., "Performance Rating" 440). The user can view, without looking up any other information system, detail information about the supplier attribute (e.g., how the rating is determined, who provides this information, sample performance ratings, and other related information), which cannot be presented in a tool-tip box due to the size and/or other characteristics of the information.

Figures 6, 7:
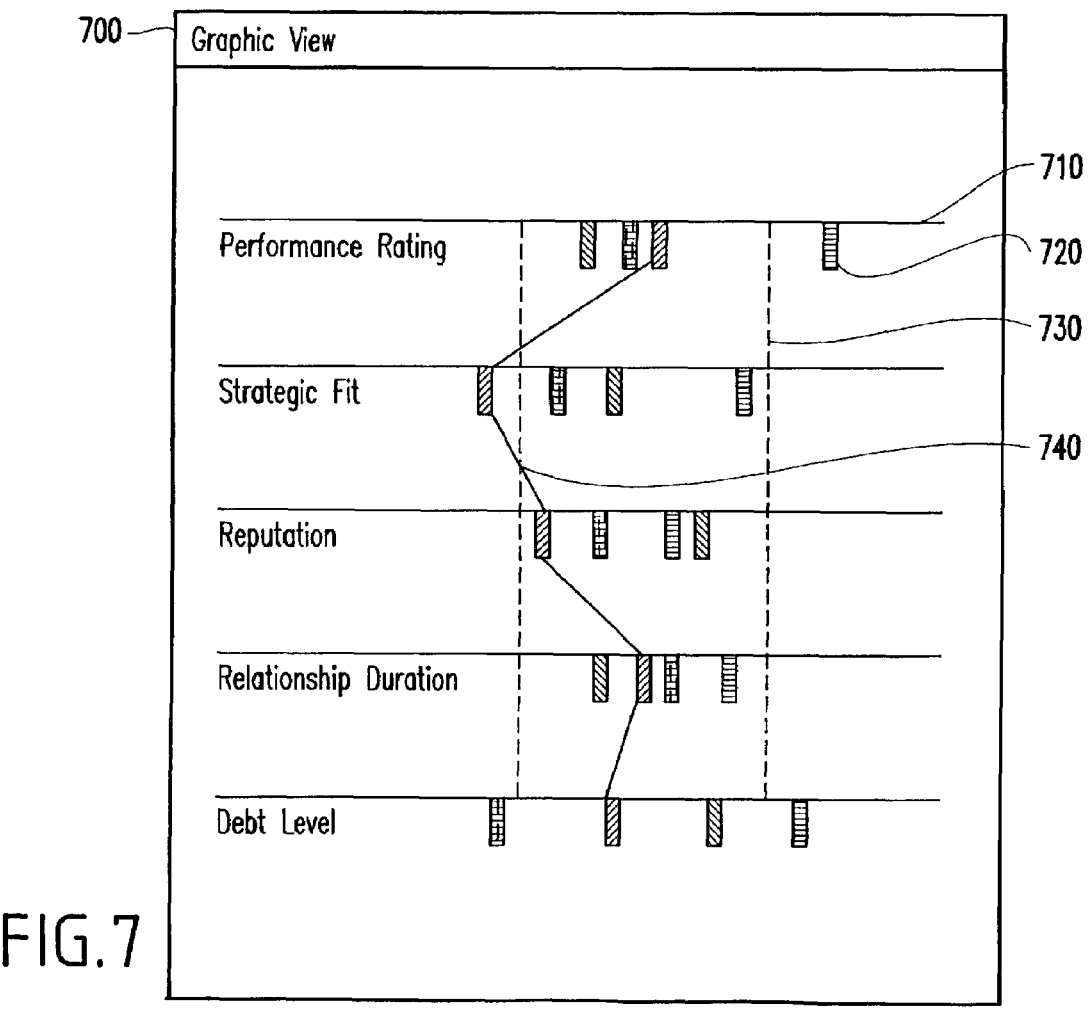
FIG. 6 is a Table View 600.
FIG. 7 is a display of the information of a supplier in a Graphic View 700.

FIG. 6 is a Table View 600, which along with the Graphic View 700, presents the set of alternative suppliers that is the object of evaluation by using the attributes and their values given in the Tree View 400.

In the Table View 600, each row 620, 630, and 640 represents an alternative supplier, while columns 660, 650, and 665 represent the attributes set in the Tree View 400 and the score 650 of alternative suppliers.

In the Table View 600, the user can sort the alternative suppliers by each column, either in an ascending order or in a descending order. The Table format is a popular form with which most business users are already familiar. To accommodate the view along with other components (e.g., the Tree View 400 and the Graphic View 700) of the graphical user interface 100 of the supplier evaluation system of the present invention in the limited desktop space in the computer screen, a set of scroll bars 670 are attached to the Table View 600, so that the view is presented in a limited space and, if necessary, the user can scroll up and down, and left and right to view and focus on different sections of the data set presented in the Table View 600. The Table View brings up all of the suppliers meeting the desired criteria. If the user wishes to see more of the suppliers (e.g., even those not meeting the desired criteria), then the scroll bars can be employed to observe the other suppliers.

The present invention allows a user to assign relative weights 450 to individual attributes 440 of alternatives (i.e., the suppliers), and then uses an additive value function in order to compute the scores 650 of the alternatives. The system then ranks the alternative suppliers by score, and the user selects the winning suppliers among the top-rankers.

The supplier evaluation system of the present invention uses Multi-Attribute Utility Theory (MAUT) for this purpose. The basic hypothesis of MAUT is that in any decision problem, there exists a real valued function U defined along the set of feasible alternatives, which the decision maker wishes to maximize. This function aggregates the criteria $x_1 \ldots x_n$. Besides, individual (single-measure) utility functions $U_1(x_1), \ldots, U_n(x_n)$ are assumed for the n different attributes. The utility function translates the value of an attribute into "utility units". The overall utility for an alternative is given by the sum of all weighted utilities of the attributes. For an outcome that has levels $x_1, \ldots, x_n$ on the n attributes, the overall utility for an alternative i is given by $$U(x_1 \ldots x_n) = \sum_{i=1}^{n} w_i U(x_i)$$

The alternative with the largest overall utility is the most desirable under this rule. Each utility function $U(x_1)$ assigns values of 0 and 1 to the worst and best levels on that particular objective and $$\sum_{i=1}^{n} w_i = 1, w_i > 0$$

Consequently, the additive utility function also assigns values of 0 and 1 to the worst and best conceivable outcomes, respectively. A basic precondition for the additive utility function is preferential independence of all attributes, which has been the topic of many debates on multi-attribute utility theory. Even in cases with inter-dependencies, the additive utility function is often used as a rough-cut approximation for a more complex non-linear utility function.

FIG. 7 is a display of the information of a supplier in the Graphic View 700, which basically displays the same information as the Table View 600 (i.e., the set of alternative suppliers and their attribute values).

An advantage of the Graphic View 700 over the Table View 600 is that, unlike the Table View 600, the Graphic View 700 allows the user to view the entire data set, the entire information space (i.e., all the alternative suppliers and all their attribute values), in a single screen, which facilitates exploring the information space, comparing different suppliers, and classifying alternatives by certain visual criteria. The single screen that displays the entire information space will deliver many meaningful cues to the user helping evaluation and selection of appropriate suppliers.

Furthermore, the Graphic View 700 provides a number of visual facilities to allow the user to directly manipulate data points in the view to explore and discover relevant trends and patterns in the information space.

The Graphic View 700 includes various features including that each horizontal line 710 in the view represents an attribute of suppliers selected in the Tree View 400, each short vertical line (often referred to as a "matchstick") 720 represents an attribute value of a particular supplier, and the two long vertical lines 730 and 732 represents the desirable value range of the selected attributes.

When there are changes to the lower and/or upper limit value of any selected attributes in the Tree View 400, the view rendering process 250 rearranges the location of matchsticks to keep the desirable value range lines always straight, thereby helping the users visually. It is noted that the matchsticks have certain patterns that visually help the user distinguish matchsticks that belong to different suppliers.

That is, matchsticks that have the same pattern on them belong to a same supplier, and matchsticks that have different patterns on them belong to different suppliers.

To view the entire set of attribute values of a particular supplier in the Graphic View 700, the user of the system can point and click on a matchstick 720 in the Graphic View 700 with a pointing device such as a computer mouse.

Then, a line appears on the view that connects all the matchsticks belonging to that supplier. The line is referred to as a "supplier line" 740. Viewing the entire set of attribute values of a supplier visually, by using the supplier line, helps the evaluator to quickly understand the characteristics of the particular supplier and how the attribute values of the supplier are distributed across the given attributes in comparison with the attribute values of other suppliers. The click on a matchstick works like a toggle switch.

That is, when a matchstick 720 is clicked a first time, the supplier line 740 of the matchstick appears in the Graphic View 700. Then, when a matchstick shown with its supplier line is clicked, the supplier line of the matchstick disappears from the view. To help a user recognize that his/her click on a matchstick was correctly accepted, the system preferably provides some type of visual or auditory confirmation (e.g., a "ding" sound) accompanied by a click on a matchstick.

Hence, FIG. 7 provides a very powerful view for a user. With this view, a user can tell at a glance whether a supplier meets desired criteria and how each supplier compares against other suppliers. Indeed, by linking a supplier's attributes via line 740, if connected "link lines" of a first supplier are seen to be to the right of link lines of a second supplier (and such first and second supplier lines do not cross each other), then it is clear that the first supplier is preferable to the second supplier.

Thus, each supplier shown in the table view 600 can be selected by using the pointing device and the selected supplier is shown in the graphic view 700 by the connected link line 740, which is the link line representing the supplier's attribute values. Hence, the user selecting "Acme" in the Table View of FIG. 6 by clicking on it, results in the display of FIG. 7 with the connected link line 740.

By the same token, if the user is in the graphic View 700, then the user can click on one of the matchsticks in the Graphic View 700 and a link line 740 will be presented automatically in the Graphic View 700 linking together the attributed values of the selected supplier. Similarly, in the Table View 600, the row indicating the selected supplier will be highlighted or the like.

Figure 8:
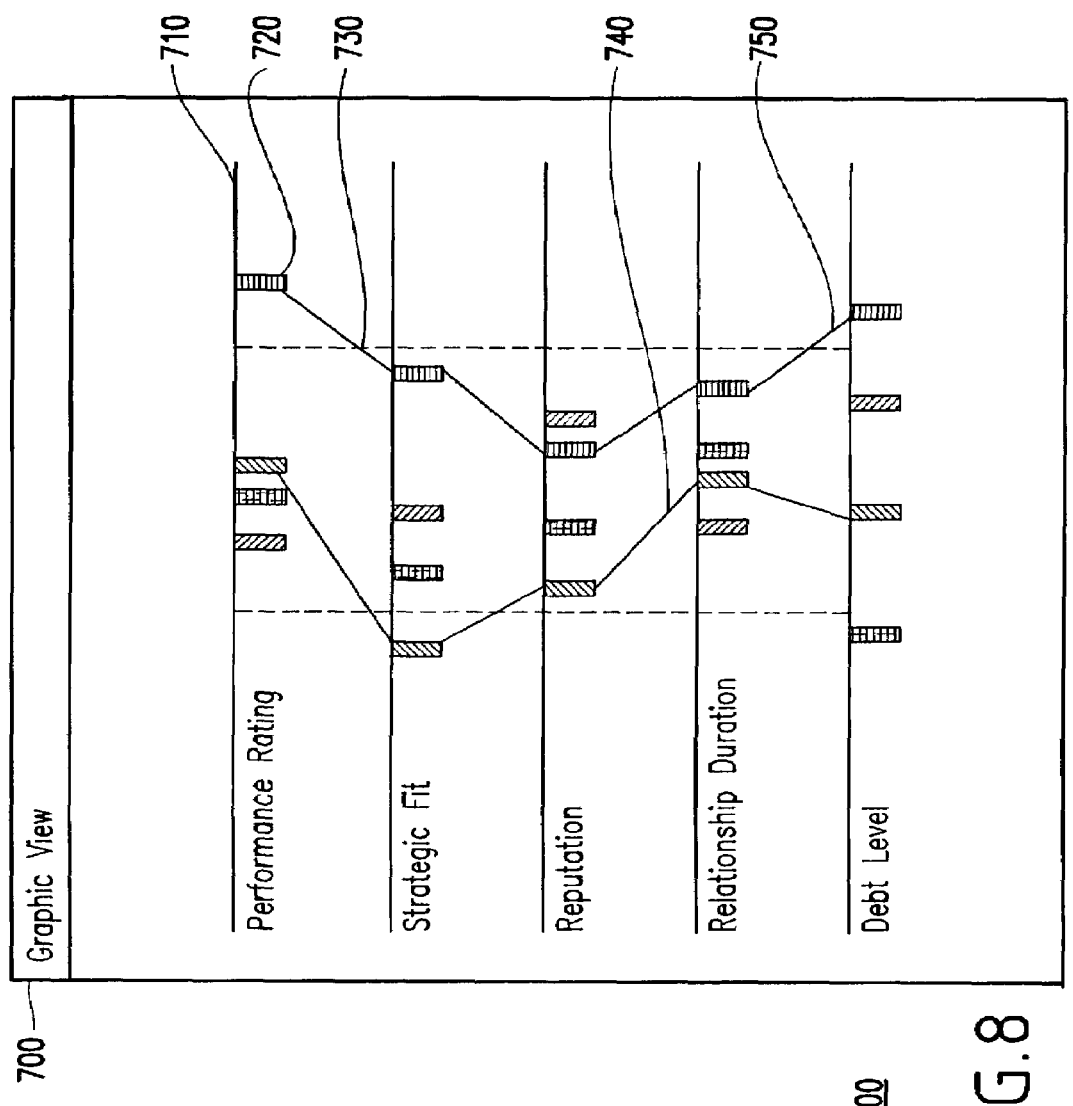
FIG. 8 is a display 800 showing a comparison of two suppliers in the Graphic View 700.

FIG. 8 is a comparison of two suppliers in the Graphic View. Comparison of two or more suppliers across the entire set of the given attributes can be done visually in the Graphic View 700 by using the supplier lines 740 and 750. The user can display the supplier lines of two or more interesting suppliers by clicking on their matchsticks with a pointing device such as a computer mouse, etc., and can compare the entire attribute values of the selected supplier in a single screen visually in the Graphic View 700. With the features of FIG. 8, the user can easily and intuitively understand how good a supplier is (especially in comparison with other suppliers) by its shape in the Graphic View 700.

It is noted that, as shown in FIG. 8, the user can select as many suppliers as desired in the Graphic View 700. Thus, the invention is not limited to two suppliers as shown in the exemplary display of FIG. 8. Again, as mentioned above, if the suppliers' attribute lines do not cross one another, then it can be determined that a supplier having the right-most attribute lines is preferable. If the lines cross one another at one or more points in the Graphic View, then the user may have to exercise judgement and/or rely on the "score" value in the Table View 600 to find the most preferred supplier. As noted above, the score value 650 is related to the "weight" value in the Tree View 400 described above.

Figure 9:
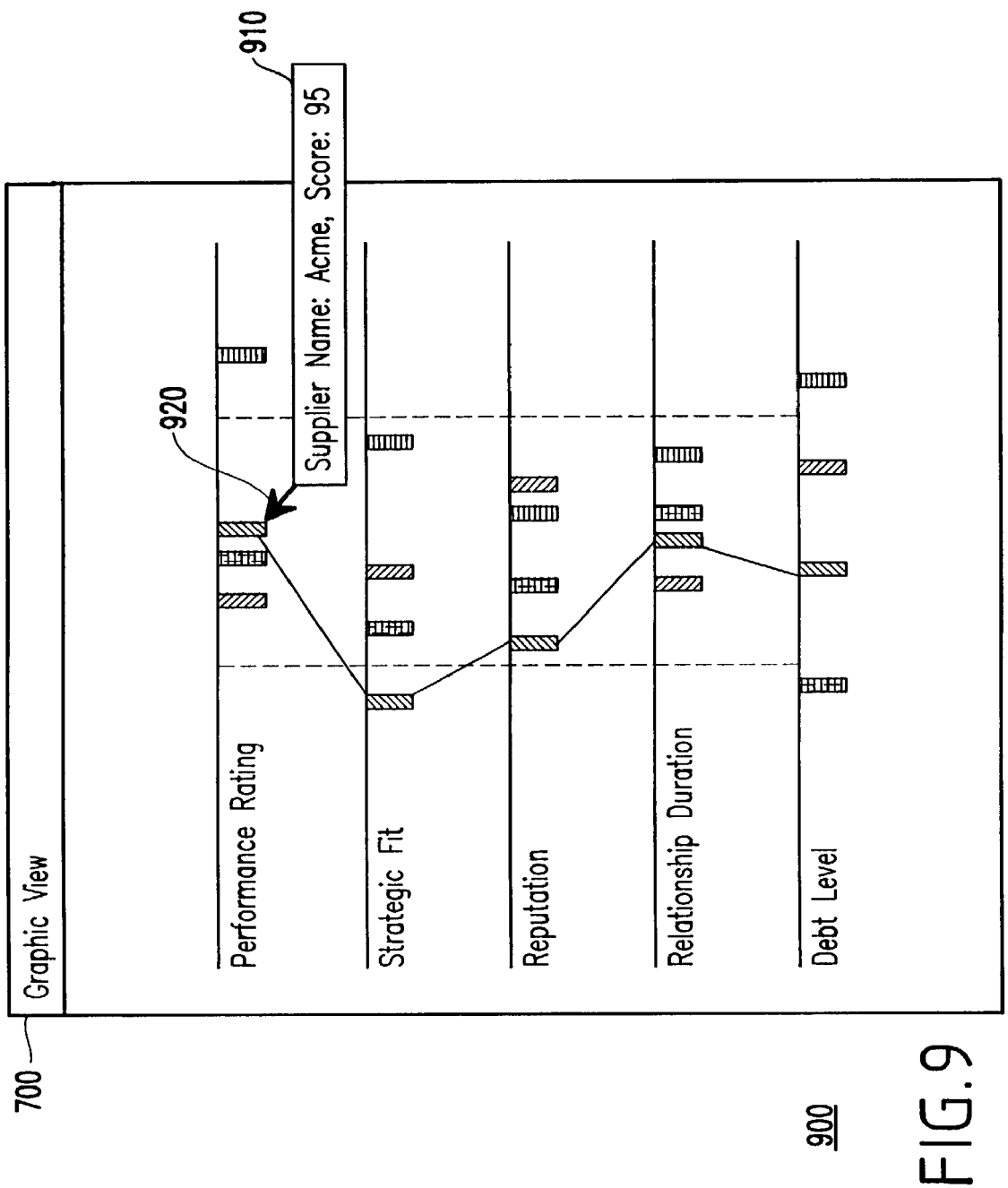
FIG. 9 is a display 900 of brief information of a supplier by using a tool-tip operation in the Graphic View 700.

FIG. 9 is a display 900 of brief information of a supplier by using a tool-tip operation in the Graphic View 700.

A user can view brief information of data entries (i.e., suppliers), in the Graphic View 700 by using a tool-tip operation. When a user points 920 at a particular data entry (i.e., a supplier line 740 or a matchstick 720), in the Graphic View 700 with a pointing device such as a computer mouse, etc. for a specific amount of time (e.g., 5 seconds), a tool-tip box such as a small pop-up window 910 automatically appears on the view that describes the particular data entry (i.e., the supplier).

There is no restriction on the type of the brief information generated by this tool-tip tool. The media of the information may be text, visual, image, sound, animation, and so on. In the particular example given in FIG. 9, the dynamically generated tool-tip box 910 gives a description about the supplier. The user can view, without looking up any other information system, the name of the supplier and its score calculated by using the relative importance of attributes given in the Tree View 400. The same score value is also shown in the Table View.

Figure 10:
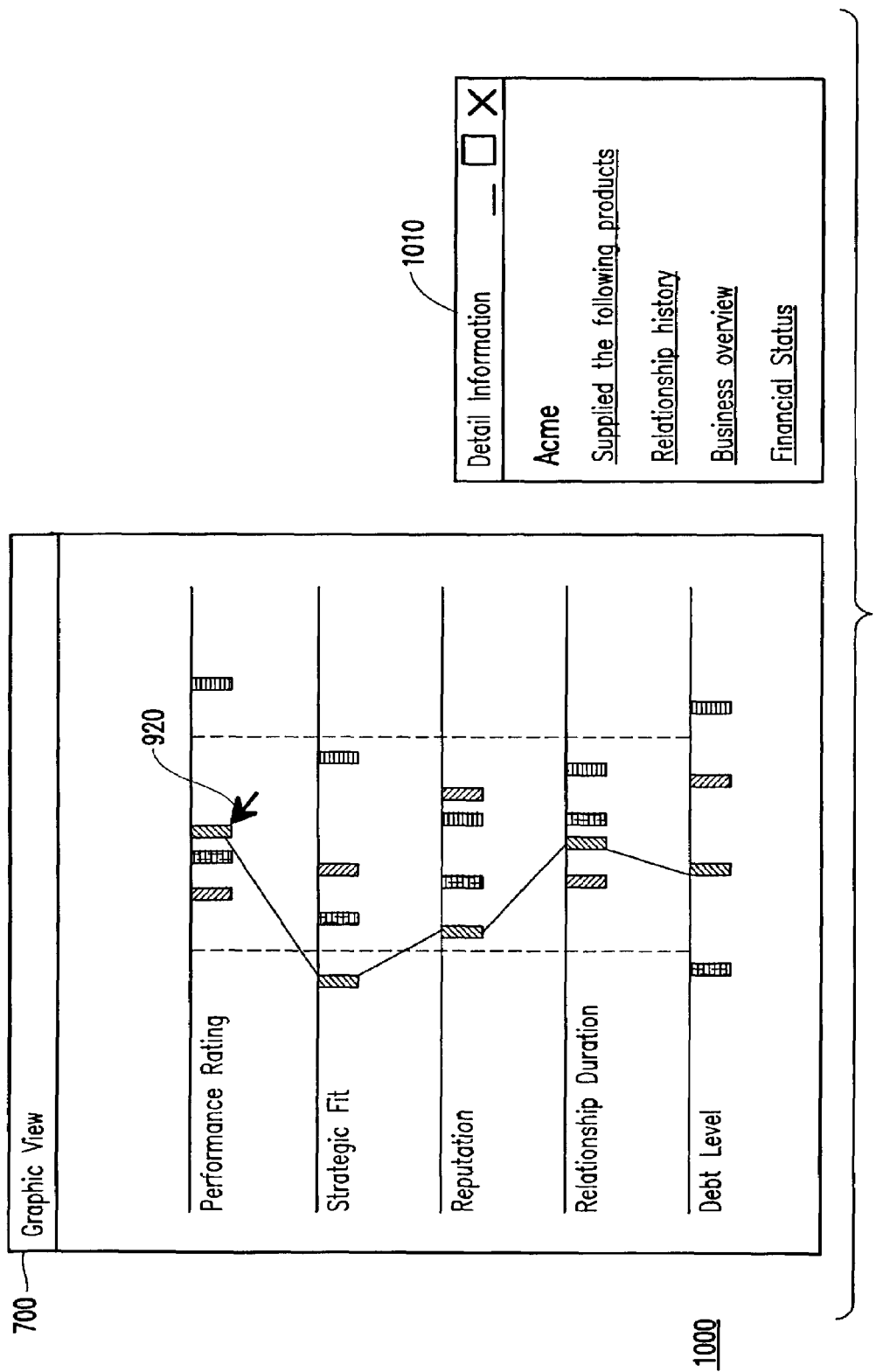
FIG. 10 is a display 1000 of detailed information of a supplier by using a pop-up window 1010 in the Graphic View 700.

FIG. 10 is a display of detail information of a supplier by using a pop-up window in the Graphic View. Certain detail description of data entries (i.e., suppliers and their attribute values) in the Graphic View 700 can be provided by using a click operation 920 of a pointing device such as a computer mouse, etc. and a pop-up window.

When a user points and clicks 920 at a particular data entry (i.e., a matchstick 720 or a supplier line 740), in the Graphic View 700 with a pointing device such as a computer mouse, a separate window 1010 pops up. Certain relevant detail information about the data entry (i.e., the supplier and/or its attribute value) in the Graphic View 700 is provided in the pop-up window 1010.

There is no restriction on the type of the detail information generated in this pop-up window. The media of the information may be text, visual, image, sound, animation, and so on. In the particular example given in FIG. 10, the dynamically generated window 1010 provides a description about a supplier. The user can view, without looking up any other information system, detail information about the supplier (e.g., its name, the products it supplies, its relationship history, its business overview, its financial status, etc.), which cannot be presented in a tool-tip box due to the size and/or other characteristics. Such information can be extracted from either public information such as a Dun & Bradstreet report, stock market evaluations, etc., or from private information from in-house sources.

Figure 11:
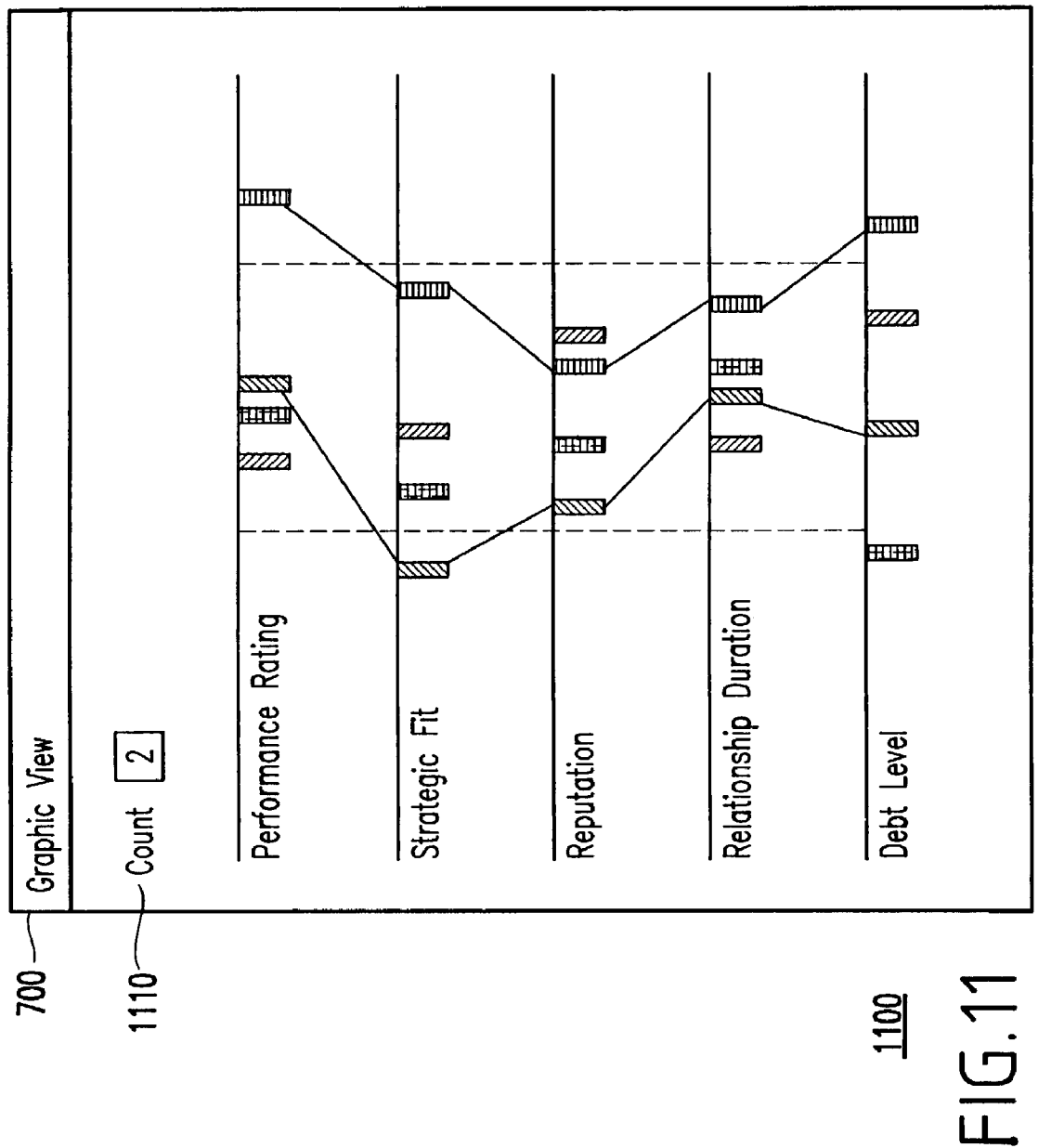
FIG. 11 is a display 1100 having count information 1110 in the Graphic View 700.

FIG. 11 is the count information in the Graphic View 700.

That is, a count window 2 is provided in the Graphic View 700 that shows the number of supplier lines displayed in the view 700. In FIG. 11, the count is "2", indicating that there are two suppliers being displayed which respectively have their attribute values linked together via link lines 740. More suppliers (or less suppliers) than two may be selected. Indeed, the count may be "0" indicating that no suppliers have their attributes linked.

This feature is useful in an analysis practice where the supplier evaluator removes unfit suppliers one-by-one from the view. Also, this feature is especially useful when used with the "Show" filter that will be explained below with reference to FIG. 12, for quickly narrowing down the analysis for a large set of potential suppliers to focus the analysis on only top-ranked suppliers.

Figure 12:
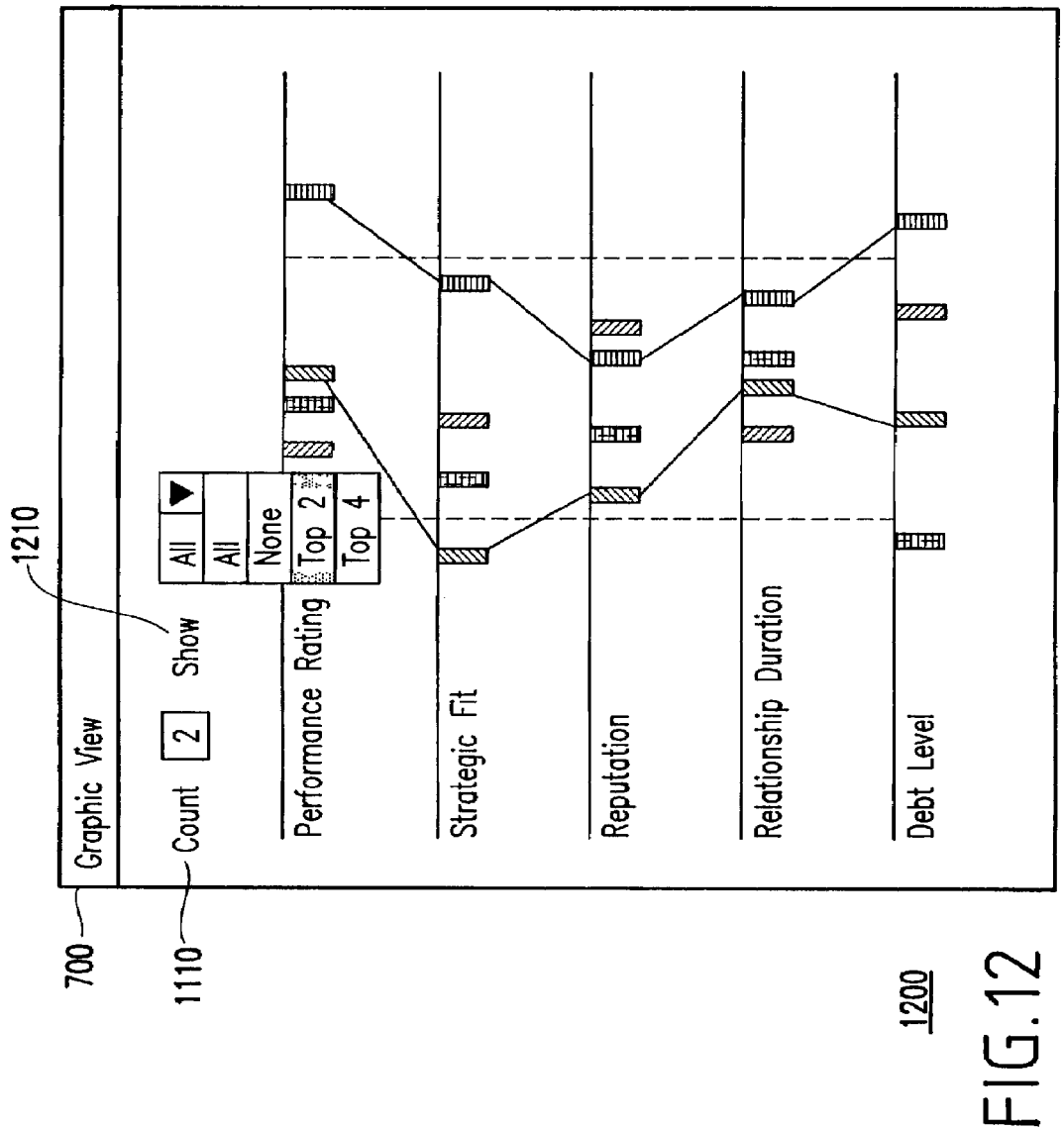
FIG. 12 is a display 1200 of a filter using supplier scores.
Figure 14:
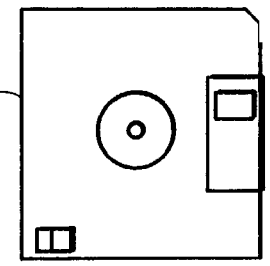
FIG. 14 illustrates a storage medium 1400 for storing steps of a program of the method for interactive visual analysis of evaluating and selecting suppliers for enterprise procurement.

FIG. 12 is a display of a filter using supplier scores, which shows another method in which a user can select and link attribute values in various ways. For example, as described above, the user may link supplier attribute value by selecting a supplier from the Table View by using a pointing device, or by clicking on the attribute value in the Graphic View 700.

However, especially when there is a large data set of alternative suppliers, the filter of FIG. 12 is useful to quickly remove inferior alternatives from consideration and to focus on a small set of alternative suppliers that are top-ranked by the scoring function of the system. By the same token using window 1210, a plurality of suppliers (or none) can be selected at one time (e.g., "all", "none, "top 2", "top 4", etc.).

The user can point to the "Show" window 1210 in the Graphic View 700, and view the possible selections of alternatives (suppliers) based on their score in the pull-down menu, and select one in the menu to display the supplier lines of the selected number of top-rankers in the Graphic View 700 by clicking on the selection in the menu by using a pointing device such as a computer mouse, etc.

In FIG. 12, the top 2 suppliers have been selected and the count information 1110 indicates "2" accordingly. If the user selected the "top 4", then the count information would reflect "4". Also, the user can select "All" or "None" to display the entire set of supplier lines or none of the lines, respectively, in the view.

It is again noted that the matchsticks showing the different suppliers have different patterns. Hence, while only four suppliers are shown (and hence only four patterns), more suppliers with different patterns can be shown.

Thus, with the above features, the user can easily and intuitively select suppliers best fitting the user's desired criteria.

Figure 13:
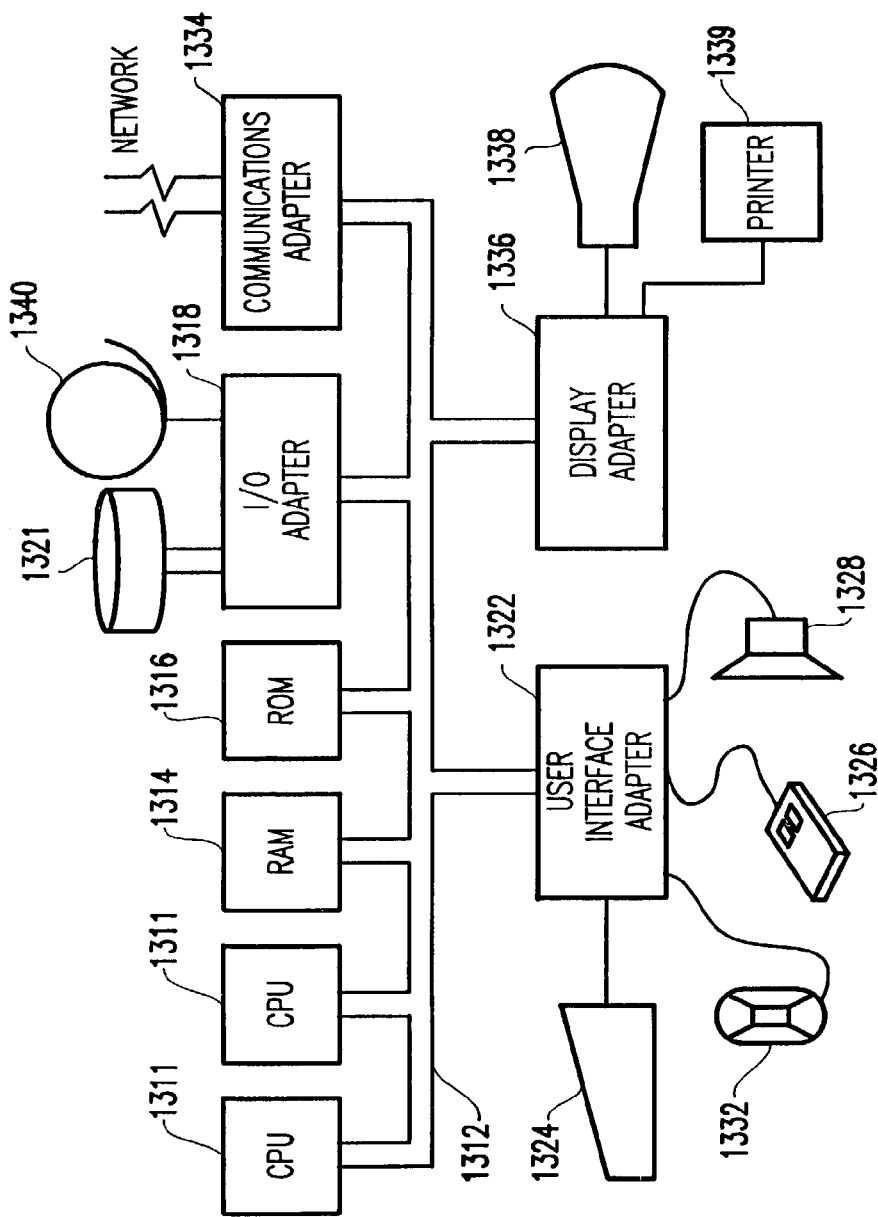
FIG. 13 illustrates a block diagram of the environment and configuration of a system 1300 for use with the present invention.

FIG. 13 illustrates a typical hardware configuration of an information handling/computer system for use with the invention and which preferably has at least one processor or central processing unit (CPU) 1311.

The CPUs 1311 are interconnected via a system bus 1312 to a random access memory (RAM) 1314, read-only memory (ROM) 1316, input/output (I/O) adapter 1318 (for connecting peripheral devices such as disk units 1321 and tape drives 1340 to the bus 1312), user interface adapter 1322 (for connecting a keyboard 1324, mouse 1326, speaker 1328, microphone 1332, and/or other user interface device to the bus 1312), a communication adapter 1334 for connecting an information handling system to a data processing network, the Internet, an Intranet, a personal area network (PAN), etc., and a display adapter 1336 for connecting the bus 1312 to a display device 1338 and/or printer.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 1311, as represented by the fast-access storage for example. Alternatively, the instructions may be contained in another signal-bearing media, such as a magnetic data storage diskette 1400 (FIG. 14), directly or indirectly accessible by the CPU 1311.

Whether contained in the diskette 1400, the computer/CPU 1311, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of preferred embodiments, those skilled in the art will recognize that the invention can be practiced with modification within the spirit and scope of the appended claims.

What is claimed is:

1. A method of evaluating and selecting suppliers for procurement, comprising:

structuring supplier information on a visual interface of a display;

providing an analysis capability for facilitating evaluation and selection of one or more suppliers for buying at least one of goods and services; and providing a plurality of views on said visual interface, said views comprising at least one of supplier information and criteria for evaluating said suppliers, and being dynamically coordinated with one another, wherein said visual interface allows a user to directly manipulate data points in the visual interface to explore an information space of potential suppliers and to discover at least one of patterns, anomalies, and trends in support of said evaluation, and wherein a data change entered by the user in a view of said plurality of views on said visual interface is automatically reflected in another view of said plurality of views in real-time.

2. The method of claim 1, wherein said plurality of views includes a tree view on said visual interface comprising a hierarchal presentation of at least one attribute of suppliers selectable by the user for consideration in said evaluation and selection of one or more suppliers for buying said at least one of goods and services.

3. The method of claim 1, wherein said plurality of views includes a table view on said visual interface comprising at least one of goods and services and at least one attribute of suppliers selected by the user.

4. The method of claim 1, wherein said plurality of views includes a graphic view on said visual interface comprising at least one of goods and services and at least one attribute of suppliers selected by the user.

5. The method of claim 1, wherein coordination between each of the plurality of views is performed in a dynamic, interactive manner, such that changes made in one view are automatically and dynamically reflected in other views in real-time.

6. The method of claim 1, further comprising:

displaying multiple attributes of suppliers for consideration in said evaluation and selection of one or more suppliers for buying said at least one of goods and services.

7. The method of claim 1, further comprising:

customizing a property of a supplier attribute for an interactive analysis.

8. The method of claim 7, wherein said property includes at least one of importance and a desirable value range.

9. The method of claim 1, further comprising:

dynamically calculating and displaying scores of suppliers based on an importance of supplier attributes dynamically set by a user.

10. The method of claim 1, further comprising:

allowing the user to dynamically include one or more attributes in the analysis of suppliers and in calculating supplier scores and ranking.

11. The method of claim 1, further comprising:
allowing a user to dynamically exclude one or more attributes in the analysis of suppliers and in the calculation of supplier scores and ranking.

12. The method of claim 1, further comprising:
displaying a brief information of an aspect of a supplier by using a tool-tip operation with a pointing device.

13. The method of claim 1, further comprising:
displaying detail information of an aspect of a supplier in a pop-up window by using a click operation with a pointing device.

14. The method of claim 1, further comprising:
filtering potential suppliers based on supplier scores and ranks.

15. The method of claim 1, further comprising:
identifying different suppliers based on a color, texture, pattern or other space filling effect of image artifacts that represent said suppliers and without referring to any text caption.

16. The method of claim 1, further comprising:
allowing the user to view the information on potential suppliers in an interactive table-based interface.

17. The method of claim 1, further comprising:
synchronizing analysis operations between a table-based interface and a visualization-based interface on said visual interface for enabling an analysis.

18. The method of claim 1, further comprising:
collecting supplier information in a central data storage from a plurality of data sources.

19. The method of claim 1, further comprising:
displaying supplier information by using the visual interface such that the user interactively analyzes the supplier information.

20. The method of claim 1, further comprising:
directly manipulating components in the display to explore and discover patterns and trends in supplier information useful for selecting one or more suppliers in buying said at least one of goods and services.

21. The method of claim 1, further comprising:
providing said visual interface of a display.

22. The method of claim 1, further comprising:
selectively presenting a tree view, a filter view, and a graphic view on said visual interface,
the tree view being a hierarchical presentation of summarized expenditure data against one or more dimensions selected by the user,
the filter view being a presentation of every dimension of expenditure data in consideration that were not selected by the user for the tree view,
wherein the user selectively refines the summarized expenditure data shown in the tree view by using one or more filters associated with the expenditure data dimensions provided in the filter view.

23. The method of claim 22, wherein the graphic view provides a visual presentation of the expenditure data shown on the tree view, and
wherein the graphic view presents the entire expenditure data set in a single screen to allow the user to explore the information space, and also allows the user to directly manipulate the data point on the graphic view to discover patterns and trends,
wherein each data entry in the tree view includes property variables, wherein the tree view includes a plurality of check boxes that are associated with supplier attributes in the tree view, one check box being provided for each attribute,
wherein the user selects one or more attributes in the tree view that are used in supplier evaluation, and
wherein when the user selects an attribute by checking the box of the attribute, the attribute is displayed as a horizontal line in the graphic view.

24. The method of claim 1, further comprising:
viewing compact and systematic presentation of business expenditure data, directly manipulating and interacting with various data points on the view on the visual interface, and filtering them with dynamically created data queries interactively.

25. The method of claim 1, wherein said data change comprises a user input for changing a display of information for evaluating said one or more suppliers in said one of said views, and
wherein said data change is automatically reflected in said other views by changing a display of information for evaluating said one or more suppliers in said other views.

26. The method of claim 1, wherein said plurality of views comprise information for evaluating said one or more suppliers and are concurrently displayed on said visual interface of said display.

27. The method of claim 1, wherein a view in said plurality of views displays information for evaluating said one or more suppliers using a format which is different from a format used to display information for evaluating said one or more suppliers in another view in said plurality of views.

28. A visual user interface for multi-dimensional analysis of evaluating and selecting suppliers for procurement, which is stored on a computer-readable storage medium, comprising:
a display screen selectively presenting a tree view, a filter view, and a graphic view, each view being dynamically coordinated with one another and comprising at least one of supplier information and criteria for evaluating said suppliers,
wherein the tree view comprises a hierarchical presentation of summarized expenditure data against one or more dimensions selected by a user,
wherein the filter view comprises a presentation of every dimension of expenditure data in consideration that were not selected by the user for the tree view,
wherein the user selectively refines the summarized expenditure data shown in the tree view by using one or more filters associated with the expenditure data dimensions provided in the filter view, and
wherein a change entered by a user in one of said tree view, said filter view and said graphic view is automatically reflected in the other two views in real-time.

29. The visual user interface of claim 28, wherein the graphic view provides a visual presentation of the expenditure data shown on the tree view, and
wherein the graphic view presents the entire expenditure data set in a single screen to assist the user explore the information space, and also allows the user to directly manipulate a data point on the graphic view to discover patterns and trends.

30. The visual user interface of claim 28, further comprising:
means for viewing compact and systematic presentation of business expenditure data, directly manipulating and interacting with various data points on the view, and filtering them with dynamically created data queries interactively.

31. The visual user interface of claim 28, wherein the tree view comprises a hierarchical presentation of various attributes of suppliers that are used in evaluating alternative suppliers for a particular purchase case.

32. The visual user interface of claim 28, wherein each data entry in the tree view includes property variables, wherein the tree view includes a plurality of check boxes that are associated with supplier attributes in the tree view, one check box being provided for each attribute,
  wherein the user selects one or more attributes in the tree view that are used in supplier evaluation, and
  wherein when the user selects an attribute by checking the box of the attribute, the attribute is displayed as a horizontal line in the graphic view.

33. The visual user interface of claim 28, wherein, when the user de-selects an attribute, a corresponding attribute line disappears from the graphic view.

34. The visual user interface of claim 28, wherein coordination between the tree view and the graphic view is performed in a dynamic, interactive manner, such that changes made in the tree view are automatically and dynamically reflected in the graphic view.

35. The visual user interface of claim 28, wherein values of property variables of attributes modified in the tree view are automatically reflected in the table view and the graphic view.

36. The visual user interface of claim 28, further comprising:
  means, using an interactive analysis capability, for dynamically changing the analysis criteria and perform what-if analyses in the table view and the graphic view.

37. The visual user interface of claim 28, wherein the tree view displays the attributes for evaluating suppliers and provides visual facilities to dynamically modify the properties of the attributes, and
  wherein the table view and the graphic view present the set of alternative suppliers which are an object of evaluation by using attributes and their values given in the tree view.

38. The visual user interface of claim 28, wherein the graphic view allows the user to view an entire data set and an entire information space, in a single screen, which facilitates exploring the information space, comparing different suppliers, and classifying alternatives by certain visual criteria.

39. The visual user interface of claim 28, wherein the graphic view provides a plurality of visual facilities to allow the user to directly manipulate data points in the graphic view to explore and discover relevant trends and patterns in an information space.

40. The visual user interface of claim 28, further comprising:
  a dynamically generated tool-tip box providing a brief description of a data entry.

41. The visual user interface of claim 28, further comprising:
  a display of detailed information of a supplier attribute including a pop-up window in the tree view,
    wherein the pop-up window including detailed information of data entries in the tree view is provided by using a click operation of a pointing device.

42. The visual user interface of claim 28, wherein in the table view, the user sorts alternative suppliers by each column, either in an ascending order or in a descending order.

43. The visual user interface of claim 28, wherein the graphic view allows a user to view an entire data set and an entire information space, in a single screen.

44. The visual user interface of claim 28, wherein a data entry's attribute values are linkable by a connected link line.

45. The visual user interface of claim 28, wherein, in the graphic view, the user selectively clicks on one of a plurality of symbols in the graphic view and a link line is presented automatically in the graphic view linking together the attribute values of a selected supplier.

46. The visual user interface of claim 28, wherein a count window is provided in the graphic view for showing a number of supplier lines displayed in the graphic view,
  wherein said count in said count window represents a number of suppliers being displayed which respectively have their attribute values linked together via link lines.

47. The visual user interface of claim 46, wherein said user selectively removes unfit suppliers one-by-one from the graphic view.

48. The visual user interface of claim 28, wherein a filter using supplier scores, allows said user to select and link attribute values.

49. A computer-readable storage medium tangibly embodying a program of machine-readable instructions executable by a digital processing apparatus to perform a method of a method of evaluating and selecting suppliers for procurement, comprising:
  structuring supplier information on a visual interface of a display;
  providing an analysis capability for facilitating evaluation and selection of one or more suppliers for buying goods and services; and
  providing a plurality of views on said visual interface, each of said plurality of views comprising at least one of supplier information and criteria for evaluating said suppliers and being dynamically coordinated with one another,
  wherein said visual interface allows a user to directly manipulate data points in the visual interface to explore an information space of potential suppliers and to discover at least one of patterns, anomalies, and trends in support of said evaluation, and
wherein a data change entered by the user in a view of said plurality of views on said visual interface is automatically reflected in another view of said plurality of views in real-time.

* * * * *